(12) United States Patent  (10) Patent No.: US 7,996,362 B2
Shimada  (45) Date of Patent: Aug. 9, 2011

(54) IMAGE PROCESSING APPARATUS, IMAGE PROCESSING SYSTEM, AND CONTROL METHOD THEREFOR

(75) Inventor: Bungo Shimada, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 549 days.

(21) Appl. No.: 11/574,040

(22) PCT Filed: Sep. 9, 2005

(86) PCT No.: PCT/JP2005/017093
§ 371 (c)(1),
(2), (4) Date: Feb. 21, 2007

(87) PCT Pub. No.: WO2005/030878
PCT Pub. Date: Mar. 23, 2006

(65) Prior Publication Data
US 2009/0002744 A1  Jan. 1, 2009

(30) Foreign Application Priority Data
Sep. 13, 2004 (JP) .................. 2004-265927

(51) Int. Cl.
G06F 7/00 (2006.01)
G06F 17/00 (2006.01)
(52) U.S. Cl. ...................... 707/626; 707/915
(58) Field of Classification Search .......... 707/626, 707/915, 999.006
See application file for complete search history.

(56) References Cited

U.S. PATENT DOCUMENTS

| | | | |
|---|---|---|---|
| 5,771,101 A | 6/1998 | Bramall | |
| 2003/0018631 A1* | 1/2003 | Lipson et al. | 707/3 |
| 2004/0109066 A1* | 6/2004 | Inoue et al. | 348/207.99 |
| 2005/0235146 A1* | 10/2005 | Douceur et al. | 713/165 |

FOREIGN PATENT DOCUMENTS

| | | |
|---|---|---|
| BR | 9508466 | 12/1997 |
| EP | 0 774 193 | 3/1999 |
| GB | 2 292 036 | 2/1996 |
| JP | 4-172541 | 6/1992 |
| JP | 7-334622 | 12/1995 |
| JP | 10-503901 | 4/1998 |
| JP | 2001-309219 | 11/2001 |
| JP | 2002-057895 | 2/2002 |
| JP | 2003-281148 | 10/2003 |
| WO | 96/04746 | 2/1996 |

* cited by examiner

Primary Examiner — Hosain T Alam
Assistant Examiner — Van H Oberly
(74) Attorney, Agent, or Firm — Fitzpatrick, Cella, Harper & Scinto

(57) ABSTRACT

This invention uses a storage device more effectively than ever before to store image data in a predetermined storage device for future security chasing. A determination unit (203) determines whether related image data which can be considered substantially identical to image data acquired by an acquisition unit (210) is stored in a predetermined storage device (202) for future chasing. If related image data is stored, link information to the related image data is written instead of writing the acquired image data to the storage device (202). On the other hand, no related image data is stored, the acquired image data is written to the storage device (202).

20 Claims, 17 Drawing Sheets

FIG. 7

```
May 17 21:52:48 192.168.0.1 imageAuditd:scan suzuki local http://192.168.0.2/storage/238473.img APPLICATION FORM FOR SEMINAR...
May 17 21:31:01 192.168.0.11 imageAuditd:copy yamaguchi local http://192.168.0.2/storage/238474.img TECHNICAL REPORT CREATION...
May 17 21:35:01 192.168.0.22 imageAuditd:fax unknown 03-5700-5800 http://192.168.0.2/storage/238475.img REQUEST FOR QUOTATION...
May 17 21:45:34 192.168.0.22 imageAuditd:fax unknown 03-5700-5800 http://192.168.0.2/storage/238476.img REQUEST FOR QUOTATION...
May 17 21:52:48 192.168.0.11 imageAuditd:scan tanaka local ftp://host.co.jp/development2003.doc [confidential] DEVELOPMENT PLAN...

May 18 08:33:51 192.168.0.1 imageAuditd:copy sato local http://192.168.0.2/storage/238484.img TECHNICAL REPORT CREATION...
May 18 08:93:32 192.168.0.1 imageAuditd:print suzuki 192.168.0.210 http://192.168.0.2/storage/238485.img APPLICATION FORM FOR ...
```

| 801 | 802 | 803 | 804 | 805 | 806 | 807 | 808 |
|---|---|---|---|---|---|---|---|
| DATE AND TIME | DEVICE ADDRESS | PROGRAM NAME | JOB TYPE | USER NAME | PATH | IMAGE DATA STORAGE URI | TEXT DATA |
| May 17 21:52:48 | 192.168.0.1 | imageAuditd | scan | suzuki | local | file://192.168.0.2/storage/238473.i | APPLICATION FORM FOR SEMINAR INTERMEDIATE COURSE ADDRESS... |

| | | |
|---|---|---|
| 1001 | TOTALBLOCK | 3 |
| | TOTALSIZE | 600,900 |
| | DPI | 300 |
| 1002 | BLOCK0 | START |
| | POS | 100,100 |
| | SIZE | 500,100 |
| | DPI | 300 |
| | URI | File://192.168.0.2/storage/238473_0.tiff |
| | HASH | e0391703e973d563686904c38c02b75d |
| | BLOCK0 | END |
| 1003 | BLOCK1 | START |
| | POS | 100,300 |
| | SIZE | 500,300 |
| | DPI | 300 |
| | URI | File://192.168.0.2/storage/238473_1.tiff |
| | HASH | 701659ae85e7d2488456839280926c4f |
| | BLOCK1 | END |
| 1004 | BLOCK2 | START |
| | POS | 100,700 |
| | SIZE | 500,100 |
| | DPI | 300 |
| | URI | File://192.168.0.2/storage/238473_2.tiff |
| | HASH | 5a7d2eb7d69419a16b7b9e98557a5e0b |
| | BLOCK2 | END |

IMAGE PROCESSING APPARATUS, IMAGE PROCESSING SYSTEM, AND CONTROL METHOD THEREFOR

TECHNICAL FIELD

The present invention relates to a technique for storing image data useful in tracking the source of leaking-out of secret information and the like.

BACKGROUND ART

The wide diffusion of image processing apparatuses has enabled anyone to easily copy or transmit a document. This has offered the user an increase in convenience but at the same time has increased the possibility of information leaking-out, such as by copying or transmission of a confidential document or the like.

To cope with the problem, there is proposed an image processing apparatus which accumulates, in a storage device, all of image data to be copied or transmitted, in addition to a user ID (National Publication of International Patent Application No. 1998-503901). This makes it possible to track which user has copied or transmitted a document with leaked-out information.

DISCLOSURE OF INVENTION

However, the above-described image processing apparatus is configured to accumulate, in the storage device, image data to be input or output, and thus the storage device tends to be filled to capacity. Also, identical image data are often redundantly stored in the storage device. In this case, the storage capacity of the storage device is particularly likely to be wasted.

Under the circumstances, the present invention has as its object to solve at least one of such a problem and other problems. Note that the other problems will be understood through the whole of the specification.

In order to solve the above-described problems, an image processing apparatus according to the present invention determines whether related image data which can be considered substantially identical to acquired image data is stored in a predetermined storage device for use in future tracking. Also, the image processing apparatus writes link information to related image data to the predetermined storage device instead of writing the acquired image data to the predetermined storage device if the related image data is stored. On the other hand, if no related image data is stored, the image processing apparatus writes the acquired image data to the predetermined storage device.

According to the present invention, if substantially identical image data are stored in the predetermined storage device for use in future security chasing, at least one of the image data is retained. Each of the remaining identical image data is replaced with link information whose data size is relatively small, and the link information is stored. Accordingly, it is possible to use the storage device more effectively than ever before.

Other features and advantages of the present invention will be apparent from the following description taken in conjunction with the accompanying drawings, in which like reference characters designate the same or similar parts throughout the figures thereof.

BRIEF DESCRIPTION OF DRAWINGS

The features and advantages of the present invention will be sufficiently understood by referring to the following detailed description of the preferred embodiments taken in conjunction with the accompanying drawings.

FIG. 7 is a view showing an example of a history file recorded on a history management server according to the embodiment;

FIG. 8 is a chart showing an example of the contents of each entry in a history record according to the embodiment;

FIG. 10 is a chart showing an example of a unique format according to the embodiment;

BEST MODE FOR CARRYING OUT THE INVENTION

Preferred embodiments will be described hereinafter, which aid understanding of the super ordinate, middle, and subordinate concepts of the present invention. Note that all of the concepts included in the following embodiments are not always described in the claims. However, such concepts are not excluded on purpose from the scope of the claims; they are not described in the claims since they have an equivalent relationship to the claims.

First Embodiment

Figure 1:
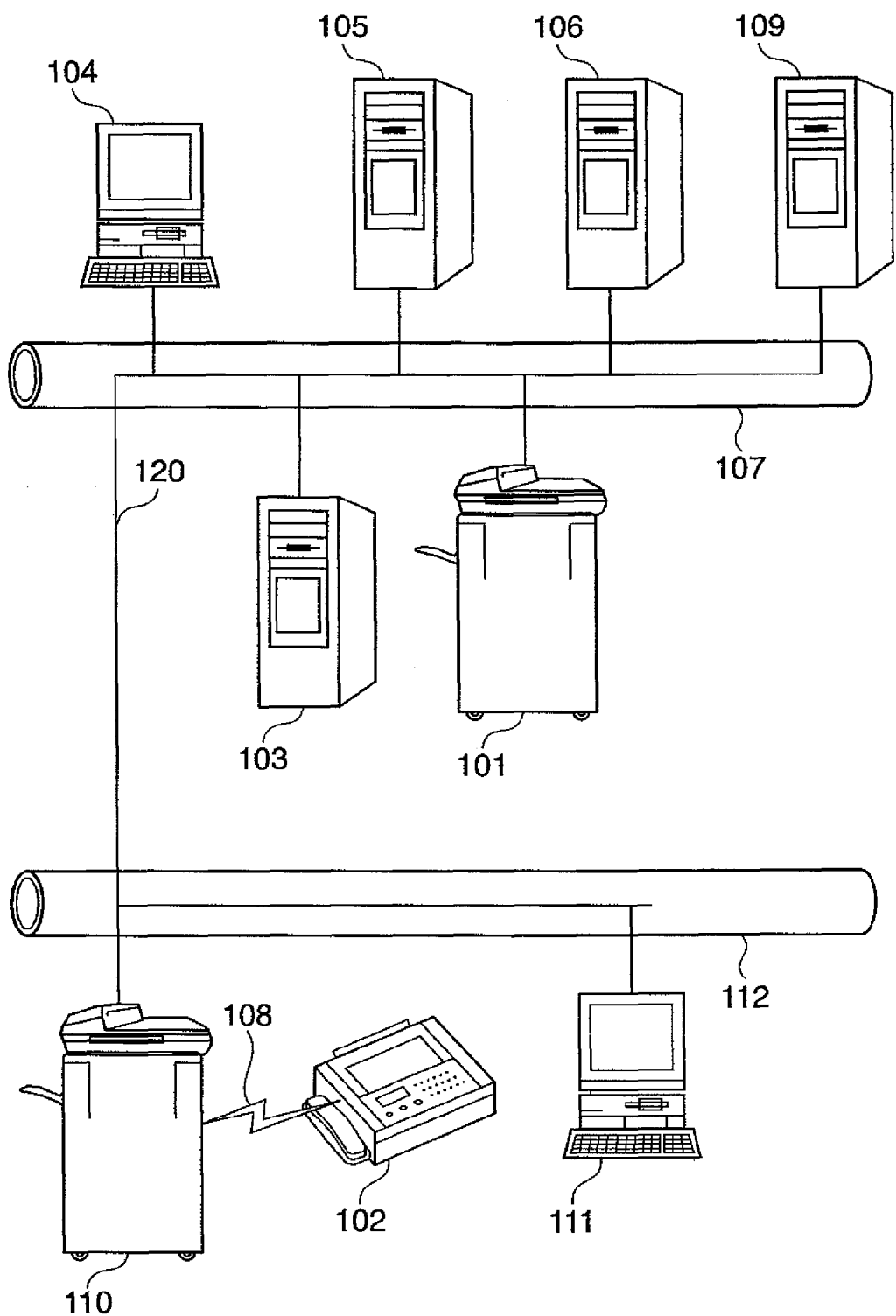
FIG. 1 is a view of an illustrative arrangement of an image processing system according to an embodiment.

FIG. 1 is a view of an illustrative arrangement of an image processing system according to an embodiment. Each of multi function peripherals 101 is an image processing apparatus which performs the process of reading, copying, or printing a document, transmits image data to various devices, and receives image data from the various devices. Any of document reading processing for converting into a file, copying, or transmitting image data, the process of receiving a print job and rasterizing it to create image data, the process of receiving image data, and the process of reading out image data from a storage device is an example of the process of acquiring image data.

A database/mail server 103 is a computer which stores data acquired by each multi function peripheral 101, and a server program which performs storage processing is running on the database/mail server 103. A client computer 104 is a computer which connects to the database/mail server 103 to download and display data stored therein. The client computer 104 can also transmit the job of printing arbitrary data to the multi function peripherals 101, a printer (not shown), or the like.

A storage server 105 is a storage device for security tracking which accumulates all image data input or output by the multi function peripherals 101. Note that each of the multi function peripherals 101 may be provided with a local storage device for security tracking. In this case, image data for tracking is transferred from each local storage device to the storage server 105 at an arbitrary timing.

A history management server 106 is a history management server which records the history record of a work job such as copying, transmission, or the like in each multi function peripheral 101. More specifically, future security tracking can be implemented by accumulating image data and history information including pieces of information such as a work device, worker, and the like.

A tracking server 109 is a server which collects data from the storage server 105 and history management server 106 and brings together the data. The arrangement of the history management server 106 in an environment where the plurality of multi function peripherals 101, storage server 105, and history management server 106 are present makes it possible to manage management data for security tracking in a unified manner.

An Ethernet (registered trademark) 107 is a network to which the multi function peripherals 101, database/mail server 103, client computer 104, storage server 105, history management server 106, and chasing server 109 are connected. Of course, the devices may be connected through other communication media.

Functions equivalent to those of the storage server 105 and history management server 106 are built into a multi function peripheral 110, in addition to the basic functions of each multi function peripheral 101. More specifically, the multi function peripheral 110 has an audit storage device which accumulates all image data input or output by the multi function peripheral 110 and has a storage device which stores a history of copy and transmission jobs in the multi function peripheral 110.

A client computer 111 connects to the multi function peripheral 110 and gives a print output instruction or an instruction to transmit an iFAX (Internet FAX). An Ethernet (registered trademark) 112 is a network to which the multi function peripheral 110 and client computer 111 are connected. A facsimile 102 is a facsimile machine which receives, through a public telephone line 108, image data acquired by the multi function peripheral 110 and prints the image data. The facsimile 102 can also transmit image data to the multi function peripheral 110 through the public telephone line 108. The Ethernet (registered trademark) 107 and Ethernet (registered trademark) 112 are connected to each other through a WAN (Wide Area Network) 120.

Figure 2:
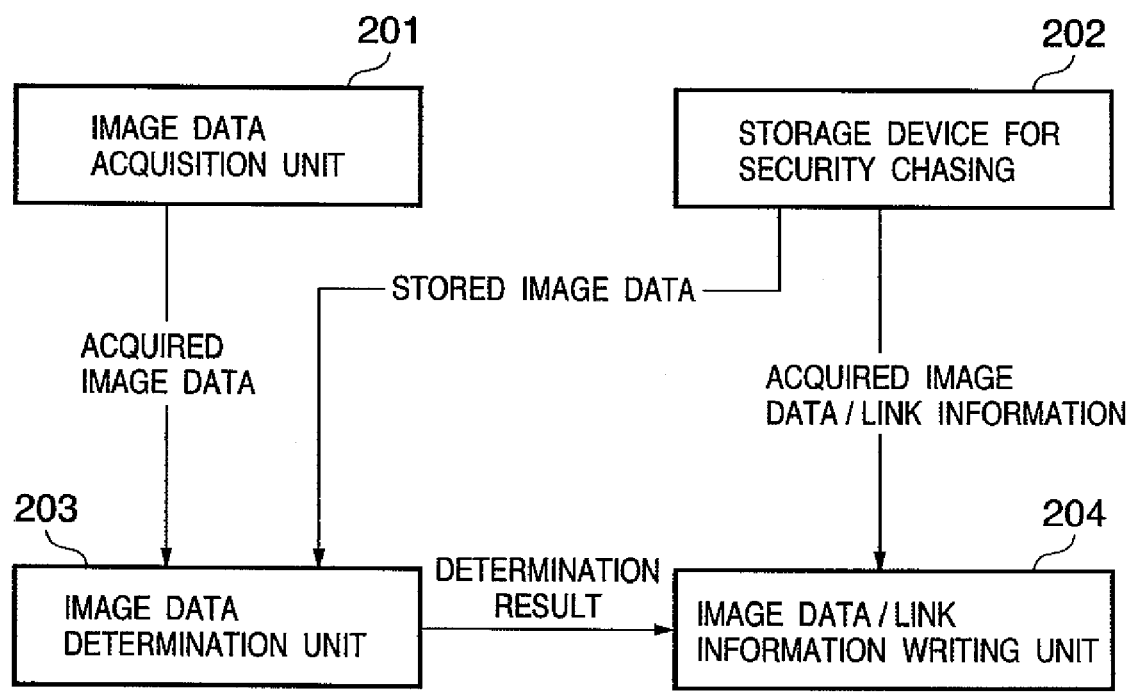
FIG. 2 is a block diagram for explaining the basic functions of the image processing system according to the embodiment.
Figure 3:
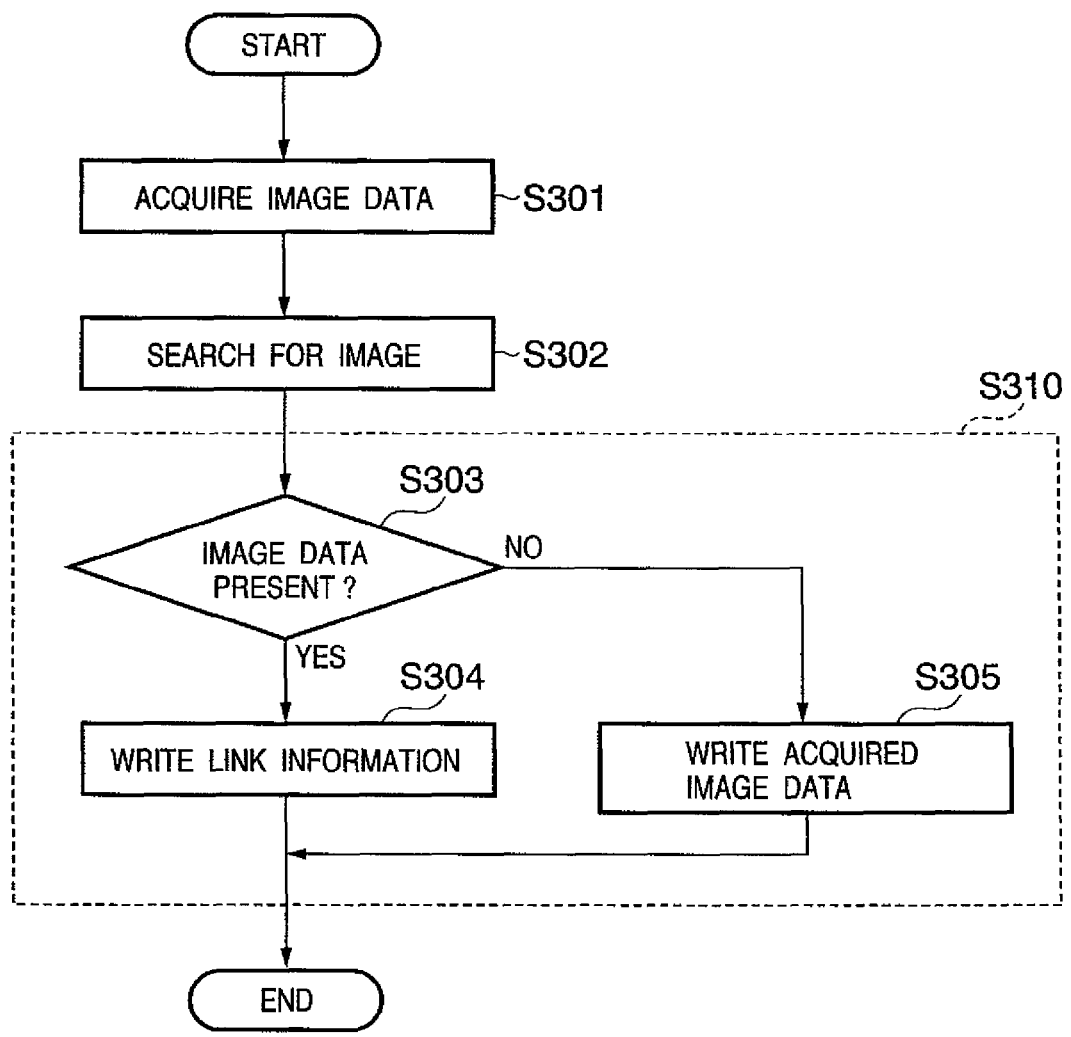
FIG. 3 is a basic flowchart of an image processing method according to the embodiment.

FIG. 2 is a block diagram for explaining the basic functions of the image processing system according to the embodiment. FIG. 3 is a basic flowchart of an image processing method according to the embodiment. These drawings are intended to exemplify the basic concept of the present invention and are implemented by the whole of the image processing system or some devices of the system.

An acquisition unit 201 is a functional unit which acquires image data and corresponds to, e.g., an image reading device mounted on a stand-alone scanner device, the multi function peripheral 101, or the like, an image data receiving device mounted on a printer, the multi function peripheral 110, or the like, or a readout device which reads out image data stored in advance for transmission.

A storage device 202 is a device which stores image data for security tracking and corresponds to the above-mentioned storage server 105 or the storage device in the multi function peripheral 110.

A determination unit 203 determines whether image data (to be referred to as related image data) which can be considered substantially identical to image data acquired by the acquisition unit 201 is stored in the storage device 202. The determination unit 203 is mounted on each of the chasing server 109, multi function peripheral 101 or multi function peripheral 110, and the like. Related image data are desirably image data which completely match acquired image data but may include image data whose similarity to the acquired image data is more than a predetermined threshold value. This is because acquired image data into which the original (related image data) has deteriorated due to repeated copying or the like also needs to be replaced with link information.

A writing unit 204 writes link information to related image data to the storage device 202 instead of writing acquired image data to the storage device 202, if it is determined that the related image data is stored. Link information is information which indicates the storage location of related image data. Examples of link information include a URI (Uniform Resource Identifier) and the like. On the other hand, if it is determined that no related image data is stored, the writing unit 204 writes the acquired image data to the storage device 202. Storage of link information to substantially identical image data makes it possible to reduce the possibility of redundant storage.

The flowchart will be explained. In step S301, the acquisition unit 201 acquires image data. In step S302, the determination unit 203 searches for and tries to extract image data related to the acquired image data. In step S303, the determination unit 203 determines whether related image data is stored, i.e., whether related image data which can be considered substantially identical is extracted by the search. If related image data is extracted, the flow advances to step S304. In step S304, the writing unit 204 writes link information to the extracted image data to the storage device 202 instead of storing the acquired image data in the storage device 202. On the other hand, if no related image data is stored, the flow advances to step S305. In step S305, the writing unit 204 writes the acquired image data to the storage device 202.

The above-described operation makes it possible not only to implement security tracking for image data input or output in an image processing system but also to use the storage capacity of a storage device more effectively than ever before.

The above-described basic technical ideas may be implemented, e.g., (1) in a single device such as the multi function peripheral 110, (2) by a plurality of devices such as the multi function peripherals 101 and multi function peripheral 110 in concert with one another, or (3) as a system using the tracking server 109 on the network and the like. In the following description, further variations of the present invention will be explained in detail.

Second Embodiment

In this embodiment, the running of an arbitrary job to the storage of a history record will be explained.

Figure 4:
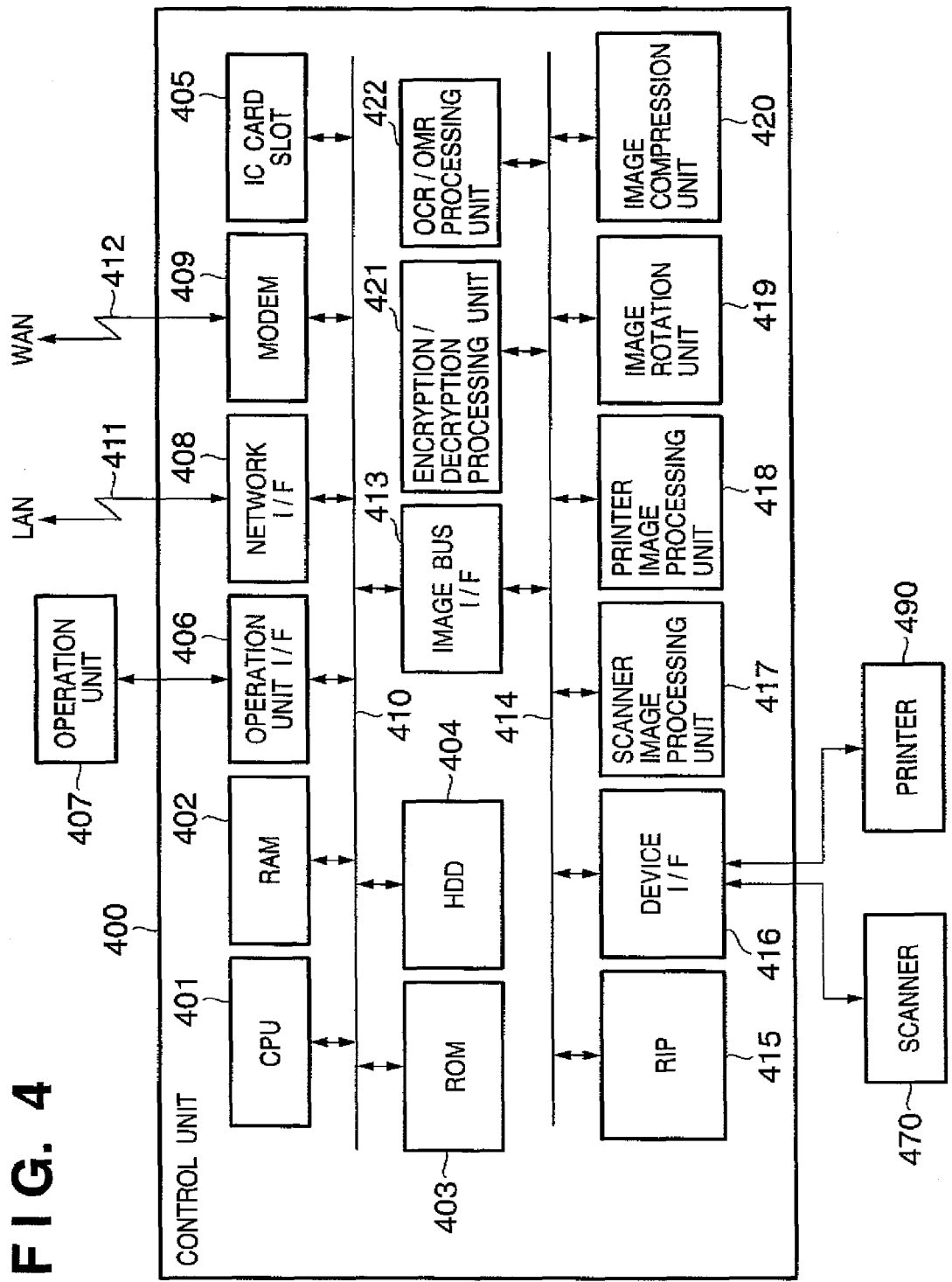
FIG. 4 is an illustrative block diagram of a multi function peripheral according to an embodiment.

FIG. 4 is an illustrative block diagram of a multi function peripheral according to the embodiment. A control unit 400 connects to a scanner 470 serving as an image input device and a printer 490 serving as an image output device and also connects to a LAN 411 and public telephone line (WAN) 412, thereby inputting or outputting image information or device information. A CPU 401 is a controller which controls the entire system. RAM 402 is a system work memory for the operation of the CPU 401 and also functions as image memory for temporarily storing image data. ROM 403 is a boot ROM in which a system boot program is stored. A hard disk drive (HDD) 404 is a storage device which stores a system control program, image data for security tracking, and the like.

An operation unit I/F 406 is an interface circuit which connects an operation unit (e.g. UI: User Interface) 407 having a touch panel and display device to output image data for display to the operation unit 407 or transmits a signal input from the touch panel to the CPU 401. A network I/F 408 is a communication circuit which connects to the LAN 411 to input or output information. A modem 409 is a communication circuit which connects to the public telephone line (WAN) 412 to input or output information. The above-described devices are arranged along a system bus 410.

An image bus I/F 413 is a bus bridge circuit which connects, to the system bus 410, an image bus 414 for transferring image data at a high rate of speed and converts one data structure into another. The image bus 414 is composed of, e.g., a PCI bus, IEEE 1394 bus, or the like.

The following devices are arranged along the image bus 414. A raster image processor (RIP) 415 is an image processing circuit which develops a PDL (page description language) code into a bitmapped image. A device I/F unit 416 is an interface circuit which connects the scanner 470 or printer 490 serving as the image input or output device to the control unit 400 to perform, for image data, synchronous system/asynchronous system conversion processing. A scanner image processing unit 417 is an image processing circuit which performs, for input image data, image processing such as correction, manipulation, or editing. A printer image processing unit 418 is an image processing circuit which performs printer correction, resolution conversion, and the like for image data to be printed out. An image rotation unit 419 is an image processing circuit which performs rotation processing for image data. An image compression unit 420 is a code processing circuit which performs JPEG compression/decompression processing for multivalued image data and JBIG, MMR, or MH compression/decompression processing for binary image data. An IC card slot 405 is a connection circuit which connects an IC card medium storing information used for encryption processing. For example, when an appropriate PIN (personal identification number) code is input from the operation unit 407, the IC card medium outputs a key used for encryption and decryption. An encryption/decryption processing unit 421 is a hardware accelerator board which uses a key output from the IC card slot 405 to perform data encryption and decryption processing. An OCR/OMR processing unit 422 is an image processing circuit which decrypts character information or a two-dimensional barcode contained in image data to convert it into character codes.

Figure 5:
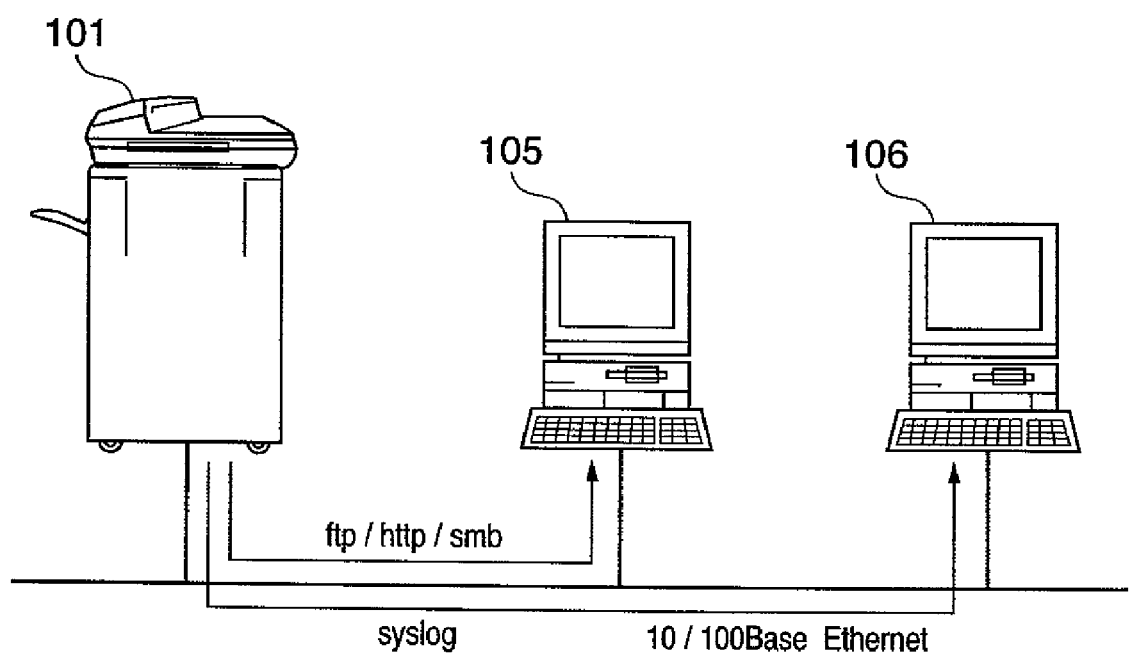
FIG. 5 is a view for explaining the process of storing image data, history information, and the like according to the embodiment.

FIG. 5 is a view for explaining the process of storing image data, history information, or the like according to the embodiment. According to FIG. 5, HTTP (Hyper Text Transfer Protocol), FTP (File Transfer Protocol), and SMB (Server Message Block) are used to store image data from a multi function peripheral 101 to a storage server 105. The present invention, however, is not limited to these communications protocols. Any transfer protocol can be used as far as it can transfer image data and the like. Encryption processing may be performed as needed.

Also, although syslog is used to write history information from the multi function peripheral 101 to a history management server 106, any other logging protocol may be adopted. According to FIG. 1, the multi function peripheral 101, storage server 105, and history management server 106 are separately provided, but some or all of them may be integrated into one piece. Setup information required to access the storage server 105 and history management server 106 is desirably protected such that only the system administrator of the multi function peripheral 101 can set it.

Figure 6:
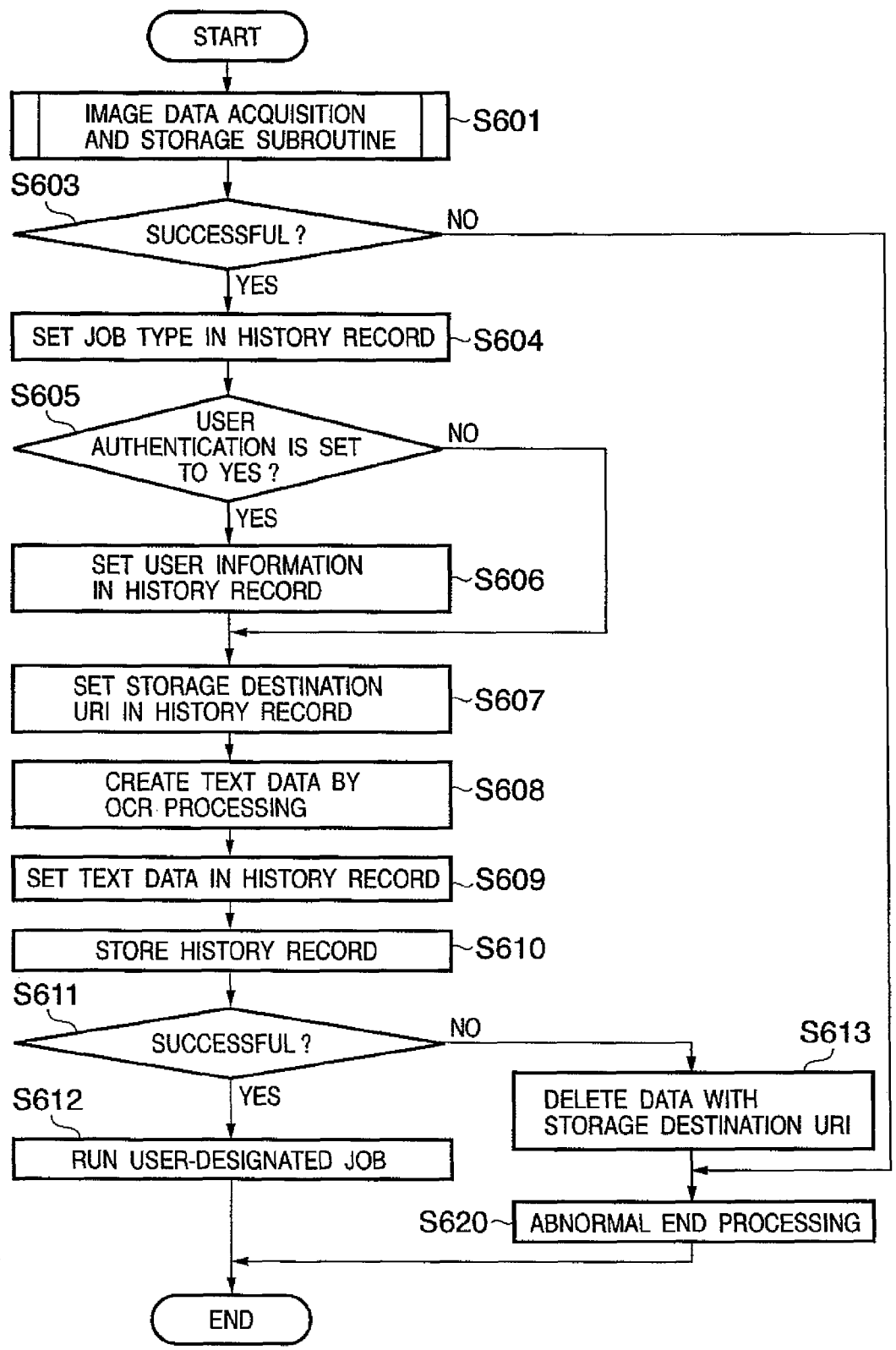
FIG. 6 is a flowchart showing the process of storing image data for chasing and a history record according to the embodiment.

FIG. 6 is a flowchart showing the process of storing image data for chasing and a history record according to the embodiment. More specifically, the process of storing all of acquired image data (some may be converted into link information) in a predetermined storage device and recording, in history records, their URIs and text data contained in the image data will be explained using the flowchart. This flowchart starts when, for example, in the multi function peripheral 101, a document is placed on an automatic document feeder or document table of the scanner 470, and number-of-copy setting or destination address setting, or the like is performed through the operation unit 407 so as to meet a desired purpose such as copying or transmission.

In step S601, the CPU 401 executes the subroutine used in FIG. 3. For example, the CPU 401 stores image data, generated by the scanner image processing unit 417 from a document read by the scanner 470, page by page in the HDD 404 (S301). The CPU 401 reads out the image data stored in the HDD 404, searches for related image data (S302), and determines whether related image data is present (S303). If related image data is present, the CPU 401 stores the URI of the related image data in the predetermined storage server 105 through the network I/F 408 (S304). On the other hand, if no related image data is present, the CPU 401 stores the acquired image data in the predetermined storage server 105 through the network I/F 408 (S305).

The storage processing into the storage server 105 may be performed in either of the following manners. More specifically, a plurality of pages may be separately stored or the plurality of pages may be stored after being integrated into one document. Note that when storing image data or link information (e.g., a URI) to the image data, the CPU 401 stores the URI of the image data in the RAM 402. This URI is created by the CPU 401 from the URL of the storage server 105, the file name of the image data, and the like.

In step S603, the CPU 401 determines whether the storage processing is successful. If the storage processing is unsuccessful, the flow advances to step S620. In step S620, the CPU 401 causes the operation unit 407 to display a message to the effect that an abnormality has occurred and ends the processing according to the flowchart. On the other hand, if the storage processing is successful, the flow advances to step S604.

In step S604, the CPU 401 sets, in a history record, the job type of a job to be run and stores it in the RAM 402. In this embodiment, a job type represents a function type, and examples thereof include a copy job, fax transmission and reception job, scan job, print job, and the like.

In step S605, the CPU 401 reads out the setup information of the multi function peripheral 101 and determines whether user authentication is set to YES. The setup information is assumed to be stored in advance in the ROM 403 or hard disk drive 404. If it is determined that the user authentication is set to YES, the flow advances to step S606. In step S606, the CPU 401 sets user information (e.g., a user name or user ID) input from the operation unit 407 in the history record and stores it in the RAM 402. On the other hand, if it is determined that the user authentication is set to NO, the flow directly advances to step S607.

In step S607, the CPU 401 reads out, from the RAM 402, the URI (Uniform Resource Identifier) of the image data stored in the storage server 105 in S602 and sets the URI in the history record.

In step S608, the CPU 401 extracts text data from the image data stored in the HDD 404, using the OCR/OMR processing unit 422. It is apparent to those skilled in the art that this step may be performed next to step S601.

In step S609, the CPU 401 sets the extracted text data in the history record. In step S610, the CPU 401 writes the history record to the predetermined history management server 106.

In step S611, the CPU 401 determines whether the history record storage processing is successful. If the storage processing is successful, the flow advances to step S612. In step S612, the CPU 401 runs a job designated in advance by the user through the operation unit 407 and ends the processing according to the flowchart. On the other hand, if the storage processing is unsuccessful, the flow advances to step S613. In step S613, the CPU 401 deletes the image data stored in step S602, and the flow advances to step S620. In step S620, the CPU 401 displays a message to the effect that an abnormality has occurred and cancels the running of the job.

An example has been explained wherein image data read by the scanner 470 is stored. The present invention, however, is not limited to this. Print output can also be managed by storing image data to be output in the storage server 105.

FIG. 7 is a view showing an example of a history file recorded on the history management server according to the embodiment. The history management server 106 receives history records transmitted on a job-by-job basis from the multi function peripheral 101 or the like and stores them in a history file 700. In this example, the history management server 106 generates one record for each job and registers it in the history file 700. The history file 700 is kept in the storage device of the history management server 106 for a predetermined period to be available for security chasing.

FIG. 8 is a chart showing an example of the contents of each entry in a history record according to the embodiment. A history record 800 has the following fields (to be also referred to as entries). A date and time field 801 stores data of date and time when the history record is written. A device address field 802 stores the IP address or host name of a device having run a job. A program name field 803 stores the name of a program having performed history writing. A job type field 804 stores information about the function type of the job such as a copy job, fax job, scan job, or print job. A user name field 805 stores a user name or user ID composed of a character string or numeric value, or the like by which the user having run the job can be identified. A path field 806 stores information indicating the input path of image data. For example, a telephone number is stored in the case of a fax job, and the name or IP address, or the like of a host having given an output instruction is stored in the case of a print job. An image data storage URI field 807 stores a URI indicating the location where image data to be chased is stored. Access to this URI makes it possible to download and display the image data. A text data field 808 stores text data extracted from image data by the OCR/OMR processing unit 422.

As described above, according to the embodiment, a history record is stored in the history management server 106 while image data is stored in the storage server 105. This makes it possible to easily track image data in the future. In addition, since duplicate image data is replaced with link information, a storage device can be effectively used.

Third Embodiment

As the format of image data to be stored in a storage server 105, an existing format or unique format may be adopted. This embodiment will explain an example wherein image data is compressed using a unique format.

Figure 9:
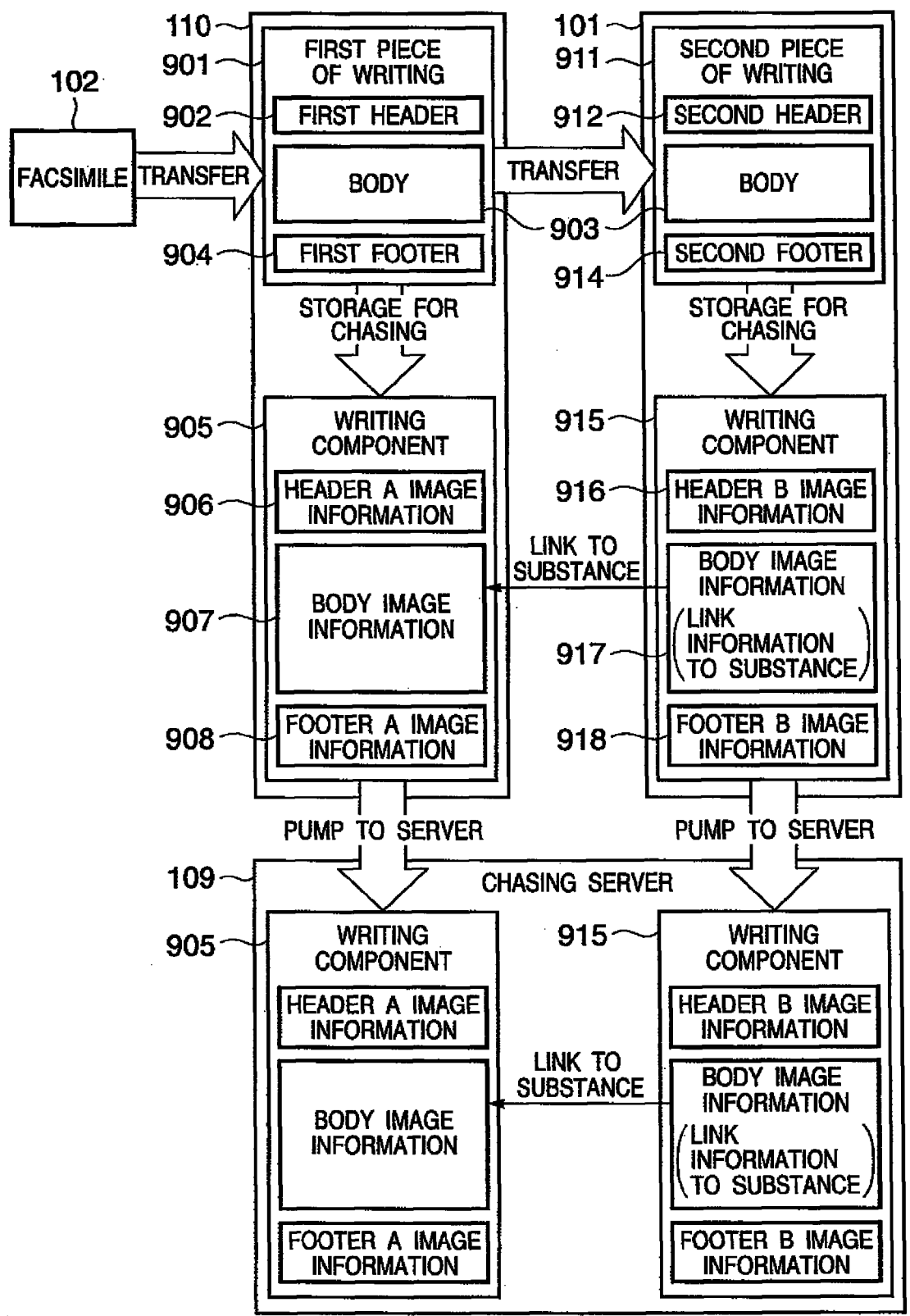
FIG. 9 is a diagram showing an example of an image format according to the embodiment.

FIG. 9 is a diagram showing an example of an image format according to the embodiment. This embodiment will explain the format of an image file with an example wherein a multi function peripheral 110 transfers, by fax, image data 901 received from a facsimile 102 to a multi function peripheral 101.

The first document 901 indicates a facsimile image received from the facsimile machine 102 by the multi function peripheral 110. The first document 901 is composed of a first header 902, body 903, and first footer 904. A second document 911 indicates image data received from the multi function peripheral 110 by the multi function peripheral 101. The second document 911 is composed of a second header 912, the body 903, and a second footer 914. The first document 901 and second document 911 have the same body 903 but have different header sections and footer sections because they are rewritten at the time of transfer.

Both the first document 901 and second document 911 are stored, for security tracking, in a storage device such as an HDD 404 within a multi function peripheral or the storage server 105, or the like. Image files of this unique format are a first image file 905 and second image file 915.

Each of the image file 905 and 915 contains a plurality of image data, into which the original image data 901 (or 911) is divided by area extraction processing. In this example, the image file 905 is divided into a header section image information 906, body section image data 907, and footer section image data 908 while the image file 915 is divided into a header section image information 916, body section image data 917, and footer section image data 918. Note that in the second image file, the body section image data 917 is replaced with link information to the body section image data 907 of the first image file 905. This replacement processing makes it possible to save the storage area of the storage server 105 and at the same time specifies which image areas are identical, thereby improving the search performance.

Note that the image area extraction processing and image matching processing may be performed by a tracking server 109 or the storage server 105 after or when image data is stored in the storage server 105, instead of being performed by the multi function peripheral 101 or the like. If the image area extraction processing and image matching processing are to be performed when image data is stored in the storage server 105, each device accumulates image data in its storage device in advance, and replacement with link information is performed at the time of transfer processing from the tracking server 109 to the storage server 105. The transfer processing is desirably performed at an appropriate timing so as not to fill the storage device of each device such as the multi function peripheral 110 or multi function peripheral 101. Needless to say, transferred data is deleted from the storage device of each device.

Image data stored in the storage device of each device or the storage server 105 may have a resolution equal to that of the original image. However, the setting may be so changed as to reduce the resolution, in consideration of storage efficiency and search efficiency. The resolutions of image data to be stored in the storage device or the storage server 105 are desirably unified because otherwise it becomes difficult to perform image data matching processing. As a way of unifying the resolutions, for example, a single uniform resolution may be applied regardless of job type or different uniform resolutions may be applied according to job type.

FIG. 10 is a chart showing an example of the unique format according to the embodiment. The left column of the table shown in FIG. 10 contains tags while the right column contains the values of the tags. The tags include TOTALBLOCK, TOTALSIZE, BLOCK[digit(s)], POS, SIZE, DPI, URI, HASH, and the like. Reference numeral 1001 denotes an area in which information about the whole of an image file is stored. TOTALBLOCK is a tag indicating of how many areas the image file is composed. If the image file is not divided, its value is 1. TOTALSIZE is a tag indicating the size of the entire image. DPI (dots per inch) is a tag indicating the resolution of the entire image.

The area 1001 is followed by block areas 1002 to 1004. The number of block areas corresponds to the value of the TOTALBLOCK tag. In this example, the image file is composed of three areas. Each of the block areas 1001 to 1004 is sandwiched between a BLOCK[digit(s)] tag with a value of "START" and a BLOCK[digit(s)] tag with a value of "END." POS indicates the upper left end (start position) of each image. SIZE indicates the horizontal and vertical sizes of each image. In this example, the coordinate origin is set to the upper left end of the first document 901. DPI is a tag indicating the resolution of a corresponding block.

URI is a tag indicating the storage location of the image data of a corresponding block. If an identical image is present, link information pointing to the identical image is stored. For example, if an image identical to an image with a URI of "File://192.168.0.2/storage/238473_1.tiff" is present as a name of "50550_1.tiff" in a host with an IP address of 192.168.0.1, the URI of "File://192.168.0.2/storage/238473_1.tiff" is replaced with link information of "File://192.168.0.1/storage/50550_1.tiff." Also, if no other reference to the file with the URI of "File://192.168.0.2/storage/238473_1.tiff" is present, the file is deleted. This series of processes allows efficient image storage. HASH is a tag indicating a hash value calculated from the image data of a corresponding block.

Fourth Embodiment

This embodiment will explain a related image data determination subroutine (S310 of FIG. 3). This embodiment, in particular, will explain an example wherein each device such as a multi function peripheral 110 or multi function peripheral 101 performs determination processing in itself.

Figure 11:
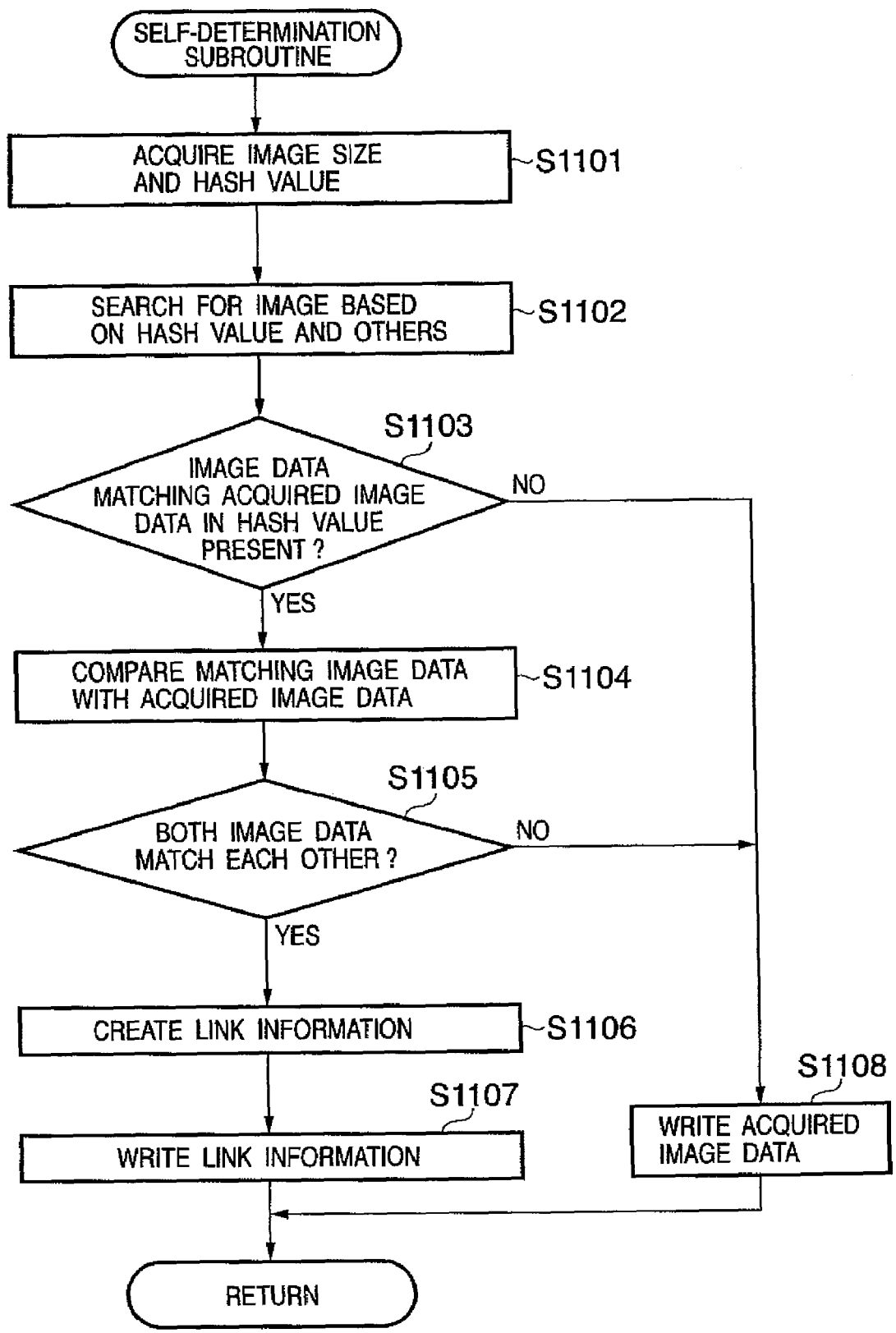
FIG. 11 is an illustrative flowchart showing a self-determination subroutine (link information replacement process) according to an embodiment.

FIG. 11 is an illustrative flowchart showing a self-determination subroutine (link information replacement process) according to the embodiment.

In step S1101, a CPU 401 performs a predetermined hash operation on acquired image data to calculate a hash value. Note that the image size may be calculated.

In step S1102, the CPU 401 searches for image data having a substantially identical hash value, image size, and the like, using the calculated hash value, image size, and the like as search keys. Although such image data is searched for among image data stored in a HDD 404, it may be searched for among image data stored in a storage server 105.

In step S1103, the CPU 401 determines whether image data matching the acquired image data in hash value and others is extracted from the HDD 404. If the extraction is unsuccessful, the flow advances to step S1108. In step S1108, the CPU 401 writes the acquired image data to the HDD 404. Note that the image data may be written to the storage server 105. If the extraction is successful, the flow advances to step S1104. With this operation, related image data candidates can be extracted. The candidates are narrowed down in subsequent steps.

In step S1104, the CPU 401 compares each of the image data extracted by the search with the acquired image data to find out whether they match each other. For example, the comparison processing is performed by calculating the similarity or correlation value between both the image data. Such comparison processing is performed because extraction of image data only on the basis of hash values and others may result in extraction of actually different image data.

In step S1105, the CPU 401 determines whether both the image data match each other on the basis of the comparison result. For example, if each of a calculated similarity, correlation value, and the like is equal to or more than a corresponding predetermined threshold value, it is determined that both the image data match each other. If they match each other, the flow advances to step S1106; otherwise, the flow advances to step S1108. With this process, final related image data is extracted. Since in the case of security tracking, image data determined to match each other desirably match completely, the threshold value is probably very high (e.g., 90%). The threshold value, of course, may be changed according to the purpose of image data storage.

In step S1106, the CPU 401 creates link information for the matching image data. In step S1107, the CPU 401 writes the created link information to the hard disk drive 404 instead of the acquired image data. The link information may be written to the storage server 105. Alternatively, as explained in the third embodiment, it is possible to replace, with link information, only one which has related image data of a plurality of image data stored in respective image files and compress the size of the corresponding image file.

Note that another method can also be considered as the method of searching for image data substantially identical to the acquired image data in step S1102 or the method of determining whether the extracted image data matches the acquired image data in step S1105. For example, image data having a high degree of similarity to the acquired image data may be determined as identical image data on the basis of the similarity in image layout. Also, image data may be compared with the acquired image data using a pattern matching method, and one having a high degree of match with the acquired image data may be determined as identical image data. Moreover, comprehensive determination may be performed using determination results obtained by these methods. If image data is to be separated into a plurality of image areas, as shown in FIG. 9, determination may be performed in the following manner. More specifically, a hash value may be calculated in advance for each image area of the acquired image data, and whether image data is substantially identical image data may be determined on the basis of the number of image areas of the image data matching corresponding image areas of the acquired image data in hash value.

As described above, according to this embodiment, a comparison of image data using hash values and others makes it possible to increase the processing speed of image searching. More specifically, a pixel-by-pixel comparison between image data entails an enormous amount of operations and requires a long time. In contrast, a hash value is data indicating the features of image data, and its data size is considerably smaller than that of the original image data. Accordingly, the use of a hash value has the advantage that the time required for search processing can be largely reduced.

Since a comparison of image data only on the basis of hash values and others may result in extraction of image data which is actually not similar, image data are finally subjected to an accurate comparison. This makes it possible to extract only related image data that can be considered substantially identical.

Fifth Embodiment

This embodiment will explain an example wherein a multi function peripheral or the like requests a server to perform the process of searching for and extracting related image data.

Figure 12:
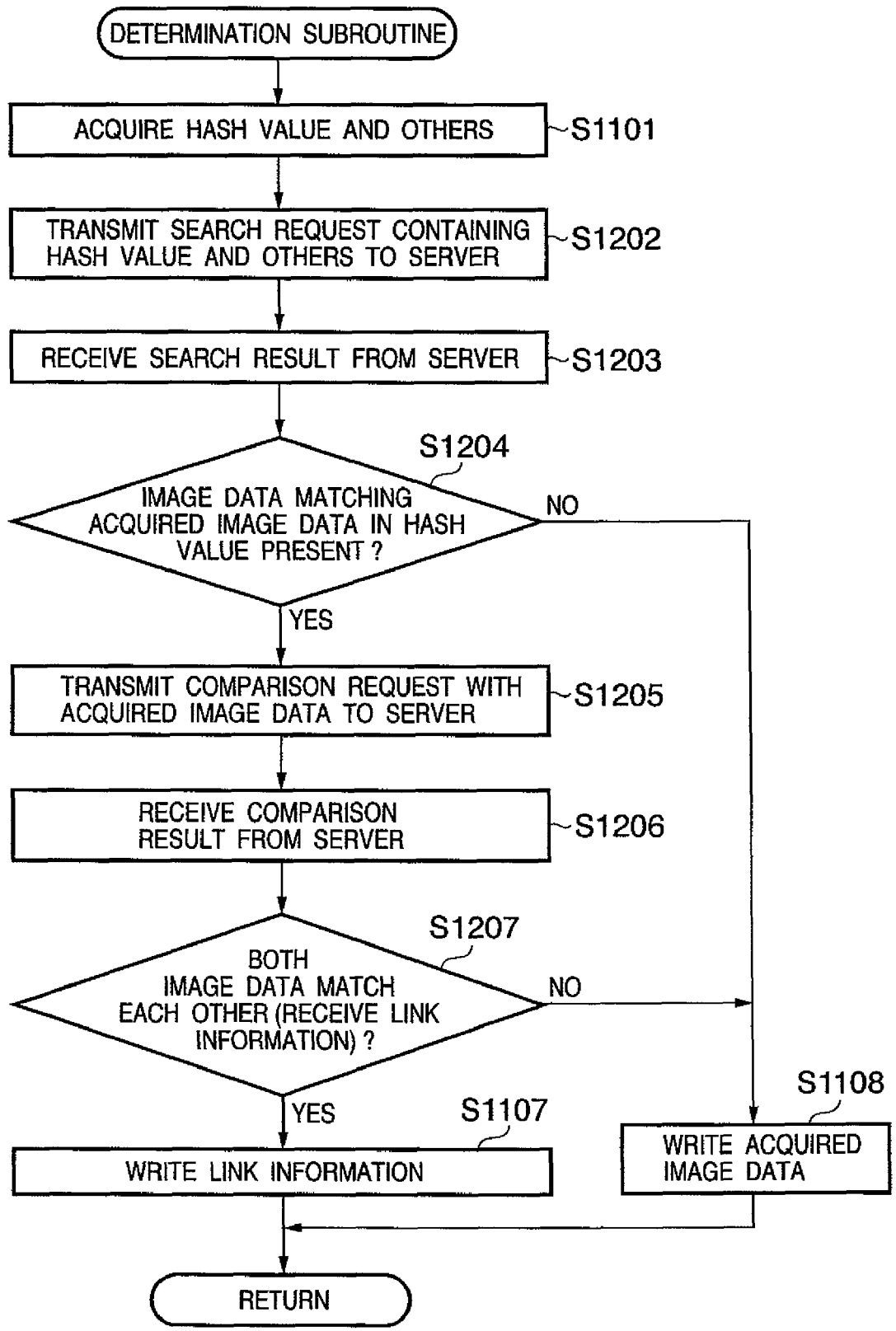
FIG. 12 is an illustrative flowchart showing a multi function peripheral determination subroutine (link information replacement process) according to an embodiment.
Figure 13:
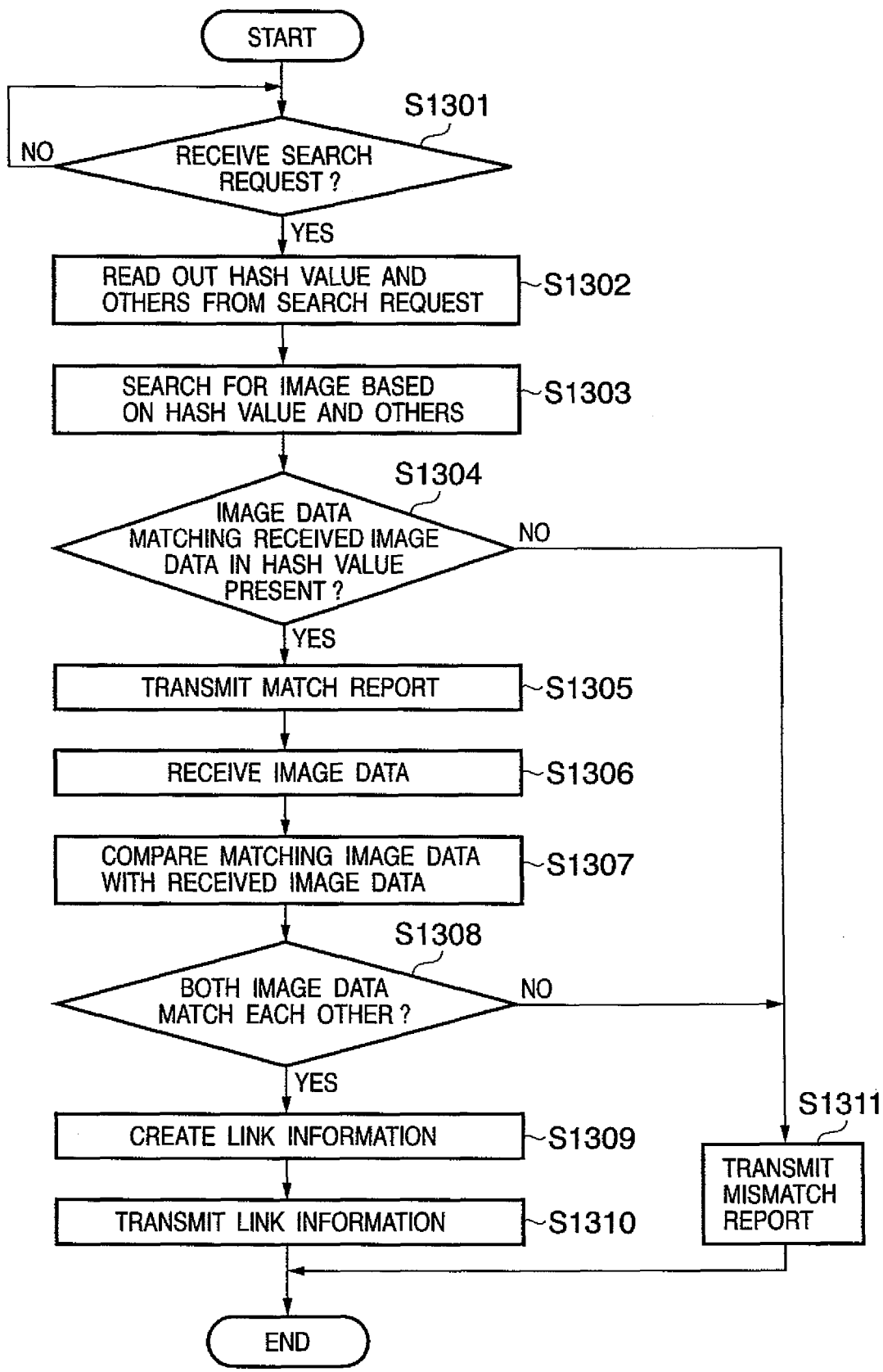
FIG. 13 is an illustrative flowchart showing image search processing by a server according to the embodiment.
Figure 14:
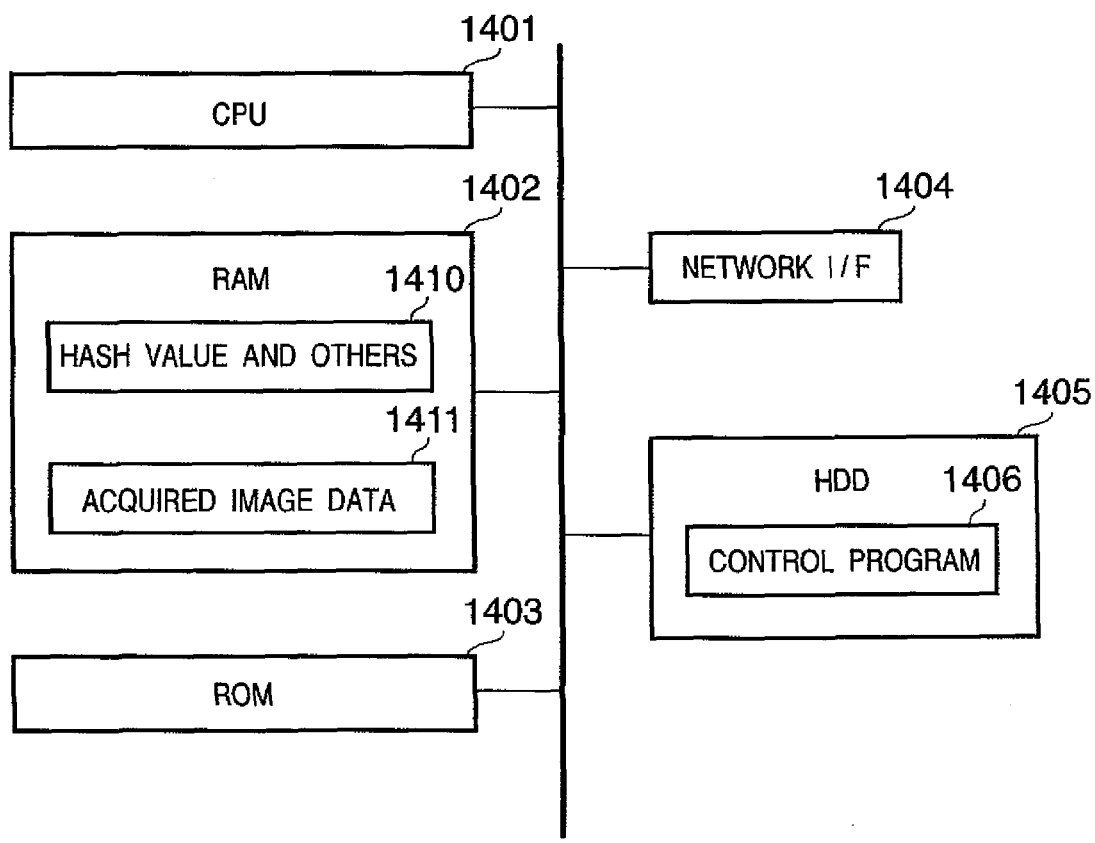
FIG. 14 is an illustrative block diagram of the server according to the embodiment.

FIG. 12 is an illustrative flowchart showing a multi function peripheral determination subroutine (link information replacement process) according to the embodiment. FIG. 13 is an illustrative flowchart of image search processing by a server according to the embodiment. FIG. 14 is an illustrative block diagram of the server according to the embodiment. In the following description, the processes already explained are denoted by the same reference numerals and will be briefly explained.

In step S1101, a hash value and others are acquired from acquired image data. The flow advances to step S1202. In step S1202, a CPU 401 of a multi function peripheral 101 creates a search request containing the acquired hash value and others and transmits the search request from a network I/F 408 to a tracking server 109.

In step S1203, the CPU 401 receives the search result from the tracking server 109. In step S1204, the CPU 401 determines from the search result whether image data matching the acquired image data in hash value and others is present. If such image data is not present, the flow advances to step S1108 to store the acquired image data. If such image data is present, the flow advances to step S1205.

In step S1205, the CPU 401 reads out the acquired image data from RAM 402, creates a comparison request with the acquired image data, and transmits the request to the chasing server 109. In step S1206, the CPU 401 receives the comparison result from the chasing server 109.

In step S1207, the CPU 401 determines from the comparison result whether image data matching the acquired image data is extracted. More specifically, matching image data is present, link information is transmitted from the tracking server 109 as or together with the comparison result. If the CPU 401 finally receives link information, the flow advances to step S1107 to write the link information. On the other hand, if the CPU 401 finally fails to receive link information, the flow advances to step S1108 to write the acquired image data.

The processing on the server side will be explained next. The tracking server 109 includes a CPU 1401, RAM 1402, ROM 1403, network I/F 1404, and hard disk drive 1405. When the server 109 is booted by a boot program stored in the ROM 1403, it performs processing according to the flowchart shown in FIG. 13. This flowchart corresponds to the processing of a control program 1406.

In step S1301, the CPU 1401 determines whether a search request is received from the multi function peripheral 101 or the like through the network I/F 1404. If a search request is received, the flow advances to step S1302 to read out data such as a hash value contained in the received search request. Note that a received hash value 1410 and others are stored in the RAM 1402.

In step S1303, the CPU 1401 searches among image data stored in the storage server 105, using the hash value 1410 and others as search keys. In step S1304, the CPU 1401 determines on the basis of the search result whether image data whose hash value and others match the hash value 1410 and others is extracted. If no image data is extracted, the flow advances to step S1311 to transmit a mismatch report to the multi function peripheral 101.

On the other hand, if matching image data is found, the flow advances to step S1305. In step S1305, the CPU 1401 transmits, to the multi function peripheral 101, information (match report) indicating that matching image data is found.

In step S1306, the CPU 1401 receives image data for comparison (the above-described acquired image data) from the multi function peripheral and stores it in the RAM 1402. If the flowchart is arranged such that the acquired image data is received at the time of reception of the search request, step S1306 can be omitted.

In step S1307, the CPU 1401 compares the extracted image data with the acquired image data. In step S1308, the CPU 1401 determines whether the extracted image data matches the acquired image data. If the extracted image data does not match the acquired image data, the flow advances to step S1311 to transmit a mismatch report.

On the other hand, the extracted image data matches the acquired image data, the flow advances to step S1309. In step S1309, the CPU 1401 creates link information to the matching image data (i.e., related image data). In step S1310, the link information is transmitted to the multi function peripheral 101 as the comparison result.

As explained above, according to this embodiment, the processing of the multi function peripheral can be reduced by requesting a server to perform the process of searching for related image data (link information creation process). Even if the multi function peripheral 101 cannot search among image data stored in the storage server 105, the multi function peripheral 101 can perform image searching through the chasing server 109. Since the storage server 105 stores image data shared by a plurality of multi function peripherals, it has a high probability of storing image data which can be considered substantially identical. This increases the possibility of deleting a duplicate image.

In this embodiment, a hash value and others are received as a search request by the chasing server 109.

As explained above, according to this embodiment, the processing of the multi function peripheral can be reduced by requesting a server to perform the process of searching for related image data (link information creation process). Even if the multi function peripheral 101 cannot search among image data stored in the storage server 105, the multi function peripheral 101 can perform image searching through the tracking server 109. Since the storage server 105 stores image data shared by a plurality of multi function peripherals, it has a high probability of storing image data which can be considered substantially identical. This increases the possibility of deleting a duplicate image.

In this embodiment, a hash value and other data are received as a search request by the tracking server 109. Alternatively, acquired image data may be received from the multi function peripheral or the like from the beginning, and the tracking server 109 may calculate the hash value and others. Alternatively, image data matching the acquired image data in hash value and others may be transmitted to a multi function peripheral or the like, thereby performing the comparison processing (S1307 to S1309) in the multi function peripheral or the like may be executed.

In this embodiment, the tracking server 109 has been explained as an executing body. The storage server 105, however, may serve as the executing body. If the storage server 105 takes the initiative in processing, the number of data transmissions and receptions reduces between the tracking server 109 and the storage server 105, and thus the traffic on a LAN can be reduced. In addition, the transfer rate of a LAN can be prevented from causing a bottle neck in image search processing.

Sixth Embodiment

This embodiment will explain an example wherein a multi function peripheral 110 serving as an image data transmitting entity and a multi function peripheral 101 serving as a receiving entity work in concert with each other to perform image search processing. More specifically, the example explained in FIG. 9 will be explained in more detail.

Figure 15:
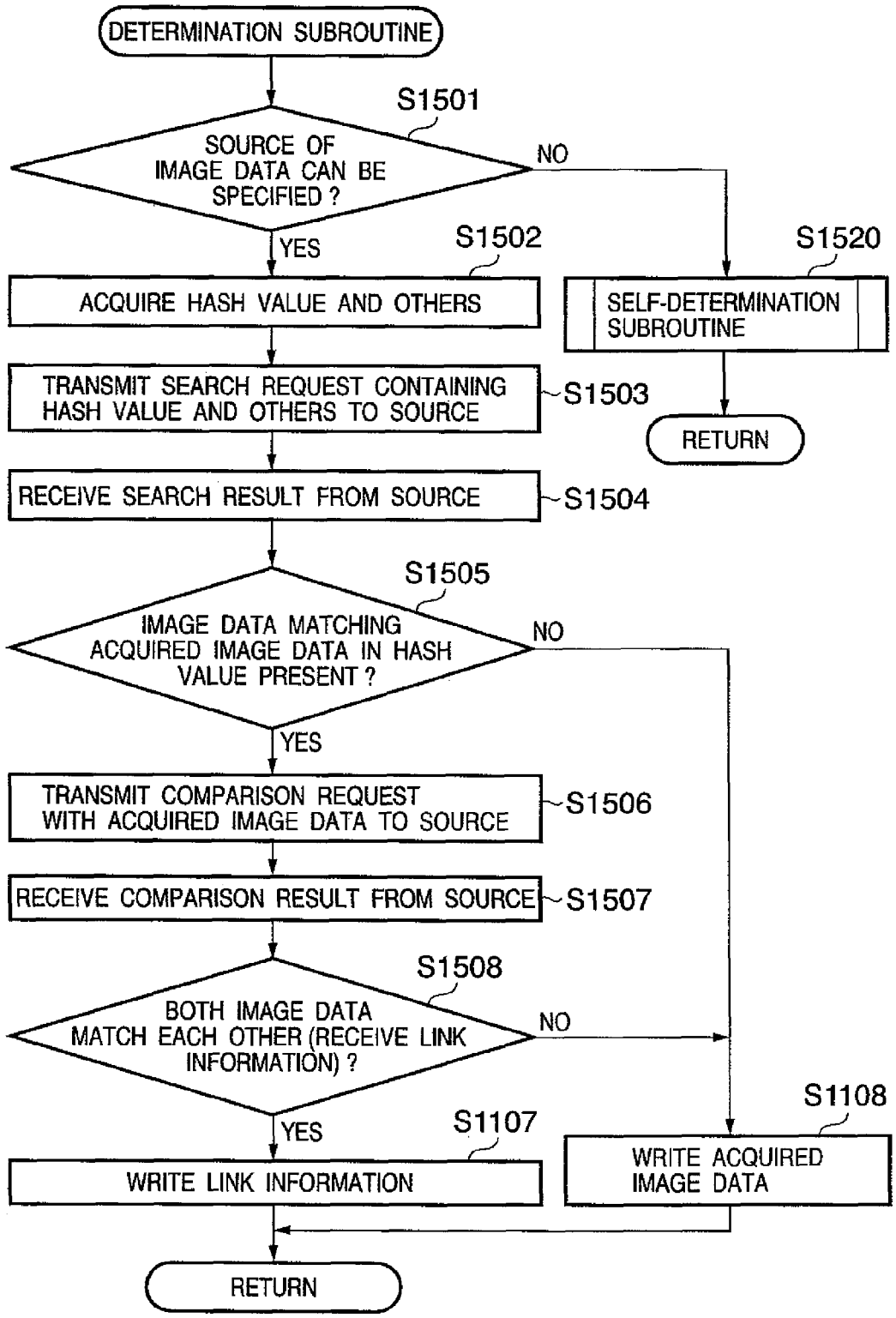
FIG. 15 is an illustrative flowchart of a determination subroutine (link information replacement process) according to an embodiment, the subroutine being to be performed in a multi function peripheral 101.

FIG. 15 is an illustrative flowchart of a determination subroutine (link information replacement process) according to the embodiment. The subroutine is to be performed in the multi function peripheral 101.

In step S1501, a CPU 401 determines whether the source of acquired image data can be specified. A source here refers to a device which serves as the origin of image data such as a scanner 470 used for image acquisition, the multi function peripheral 110 having transmitted image data, or the like. The CPU 401 stores, in RAM 402, by which device image data is acquired when it is acquired. If the result of the determination shows that the source cannot be specified, the flow advances to step S1520 to perform the self-determination routine (FIG. 11).

On the other hand, if the source can be specified, the flow advances to step S1502. In step S1502, the CPU 401 acquires a hash value and others. Note that even if the source can be specified, the flow advances to step S1520 when the device itself having received the image data is the source. An example of a case wherein a device itself having received image data is the source is a case wherein the multi function peripheral 110 acquires image data with its scanner 470.

After that, the CPU 401 performs step S1503 to step S1508. These steps correspond to steps S1202 to S1207. More specifically, the destination address of a search request is only changed from a server to a source. Since the processing is no different from that in steps S1202 to S1207, an explanation of subsequent steps will be omitted.

The processing in the multi function peripheral 110 is almost the same as the processing of the server explained with reference to FIG. 13. The difference between them lies in that the multi function peripheral 110 searches in a hard disk drive 404 of itself. Of course, the multi function peripheral 110 may search in a storage server 105.

As described above, according to this embodiment, the multi function peripheral 110 serving as the image data transmitting entity and the multi function peripheral 101 serving as the receiving entity can work in concert with each other to perform image search processing. Since there is a high probability that the original data of image data received on the receiving side is stored on the transmitting side, it is possible to efficiently extract related image data and create link information.

Seventh Embodiment

In the above-described embodiments, a timing when an image is acquired is taken as a cue to perform replacement with link information. However, it is desirable to prevent redundant storage of image data even in a system having an existing multi function peripheral which simply writes image data to a storage server 105. Under the circumstances, this embodiment will explain an example wherein a tracking server 109 or storage server 105 performs replacement with link information. The basic arrangement of the server is as explained using FIG. 14.

Figure 16:
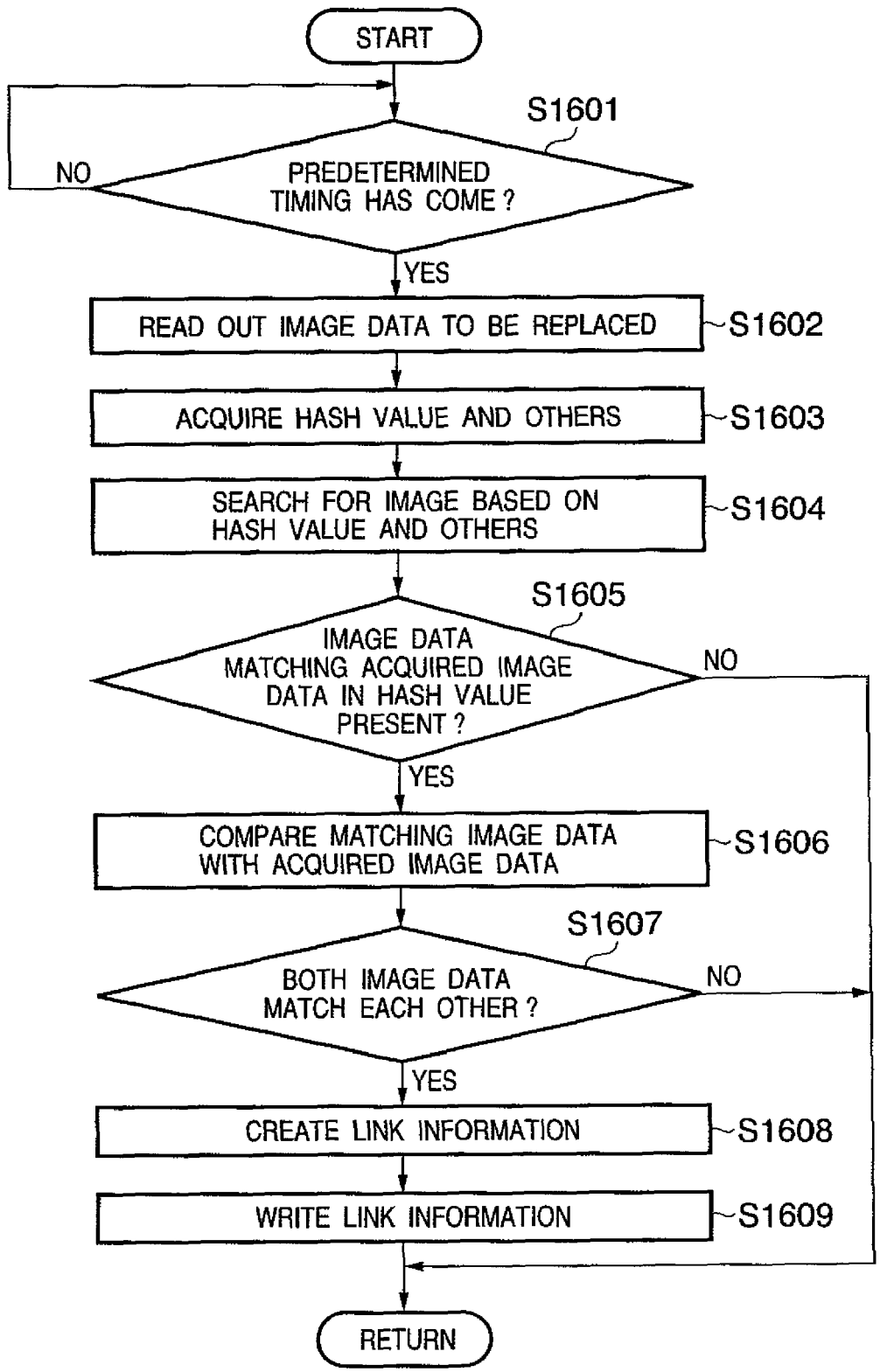
FIG. 16 is an illustrative flowchart of the process of performing replacement with link information according to an embodiment, a portion of the process similar to those of the processes already explained being to be briefly explained.

FIG. 16 is an illustrative flowchart of the process of performing replacement with link information according to the embodiment. Note that a portion of the process similar to those of the processes already explained will be briefly explained.

In step S1601, a CPU 1401 determines whether a predetermined timing when replacement with link information is to be performed has come. The predetermined timing refers to a timing acquired by a timer, such as a certain time or a time which recurs at fixed periods, a timing when a predetermined number or more of image data are newly registered, a timing when a start request is received from a multi function peripheral or the like, a timing when the CPU 1401 is requested to start the replacement processing by the administrator from a client computer or the operation unit of a server, or the like.

In step S1602, the CPU 1401 reads out image data to be replaced from the storage server 105 (HDD 1405). The image data to be replaced may be all image data registered in the storage server 105. In terms of efficient processing, image data newly registered after the last time that the replacement processing is performed is preferably targeted.

In step S1603, the CPU 1401 acquires data such as the hash value and image size of the read-out image data to be replaced. For example, if the image data has the above-described unique format, the data can be easily acquired by reading out the value of a HASH tag. The same applies to image size. On the other hand, if the image data has a data format not containing HASH data, the CPU 1401 performs a hash operation on the image data to calculate the hash value.

In step S1604, the CPU 1401 searches for related image data using the acquired hash value and others as search keys. In step S1605, the CPU 1401 determines whether image data matching the image data to be replaced in hash value and others is extracted. If matching image data is present, the flow advances to step S1606. On the other hand, if image data matching the image data to be replaced is not present, the CPU 1401 ends the processing.

In step S1606, the CPU 1401 performs image comparison of the matching image data with the image data to be replaced. In step S1607, the CPU 1401 determines on the basis of the comparison result whether the matching image data matches the image data to be replaced. If the matching image data does not match the image data to be replaced, the CPU 1401 ends the processing. If the matching image data matches the image data to be replaced, the flow advances to step S1608. In step S1608, the CPU 1401 creates link information to the matching image data (this means related image data as described above). In step S1609, the CPU 1401 replaces the image data to be replaced with the created link information and writes the link information. In the case of the unique file format, the CPU 1401 writes the link information as the value of a URI tag.

If there are a plurality of image data to be replaced, step S1602 to step S1609 are repeatedly performed (necessary steps are repeated a plurality of times corresponding in number to objects to be processed in the same manner as in other embodiments).

As described above, according to this embodiment, a server can perform replacement with link information singly.

The influence on regular processing can be reduced by setting a time for the replacement processing to a time (e.g., midnight) when a server or the like is put under light load. Even if an existing multi function peripheral which cannot perform replacement with link information for itself is present in a system, duplicate image data can be replaced with link information.

Eighth Embodiment

An example will be explained wherein a multi function peripheral 101 receives an instruction from a client computer 104 to print variable print data whose bodies are identical images and which are different only in address.

Figure 17:
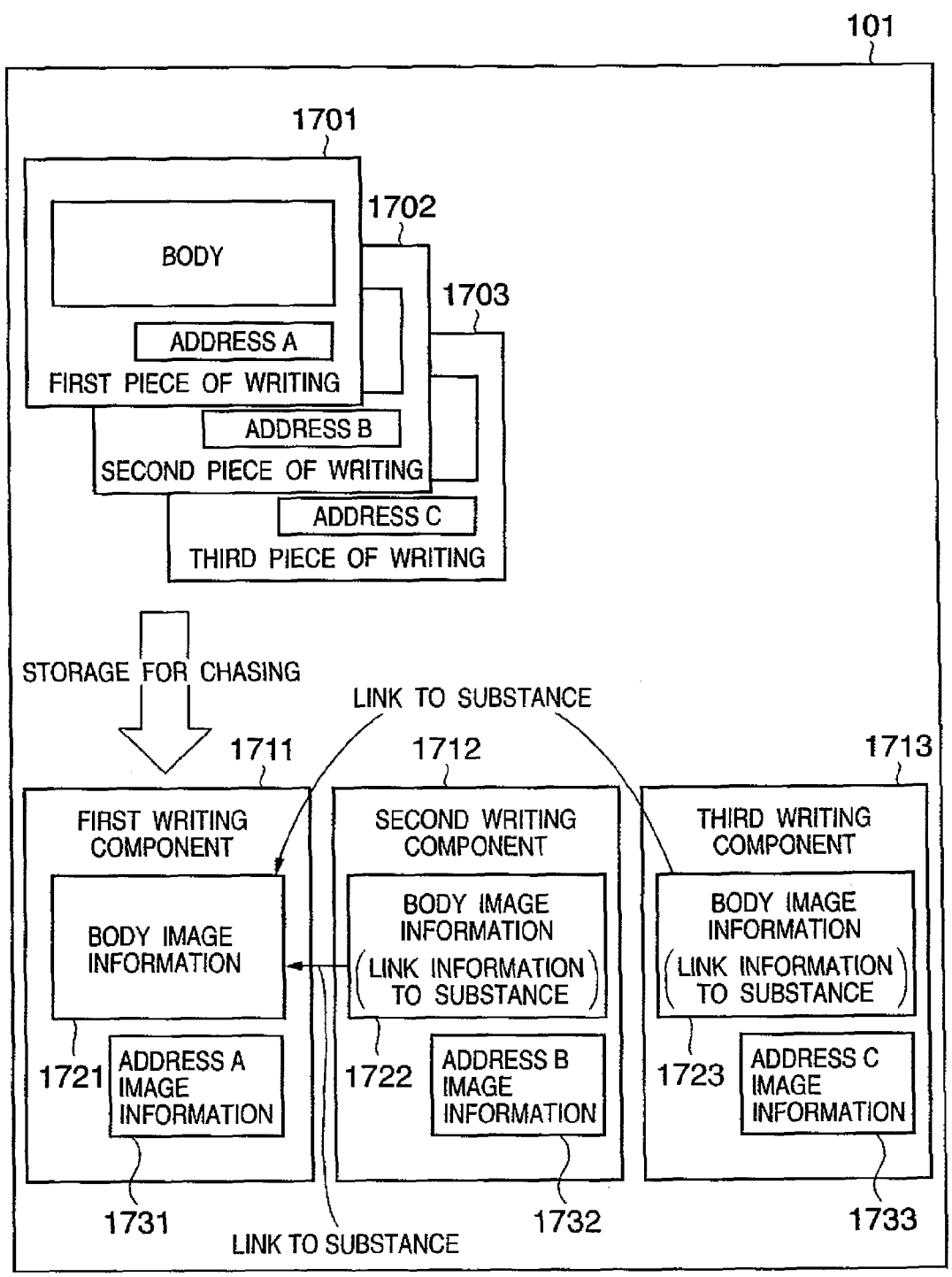
FIG. 17 is a diagram for explaining the process of performing replacement with link information according to an embodiment.

FIG. 17 is a diagram for explaining the process of performing replacement with link information according to the embodiment. In this example, the multi function peripheral 101 creates three documents (first document 1701, second document 1702, and third document 1703) for three addresses A, B, and C, using variable print data. The body images of each document 1701 to 1703 are identical image data. A CPU 401 of the multi function peripheral 101 acquires three pieces of address information registered in a database/mail server 103 on the basis of the variable print data and prints the documents with the different pieces of address information.

The CPU 401 of the multi function peripheral 101 accumulates the documents 1701 to 1703 in a hard disk drive 404. This makes it possible to chase to find out, in the future, where, by whom, and when the documents are printed. When the documents 1701 to 1703 are to be stored for chasing, they are converted into image files 1711 to 1713, respectively, according to the above-described unique format and then are stored in the hard disk drive 404.

Note that each document data is divided into a plurality of component blocks by an area extraction technique, as described above. In this example, the document data is divided into body and address blocks. With this operation, the first document file 1711 comes to include body image information 1721 and address image information 1731. The second document file 1712 is first divided into body image information and address image information 1731. With the process of performing replacement with link information, the body image information is replaced with link information 1722, thereby reducing the file size. The third document file 1713, having undergone replacement processing in the same manner, comes to include link information 1723 and address image information 1733.

Since body images certainly match each other in the case of variable print data as explained in this embodiment, the area extraction processing and image comparison processing described above can be simplified. More specifically, the CPU 401 recognizes an identical image section on the basis of the variable print data, replaces the recognized identical image section with link information, and stores the link information in the hard disk drive 404. This case has the advantage that the area extraction processing, image search processing, and image comparison processing under heavy processing load can be simplified and is desirable in terms of processing efficiency as well.

As explained above, in this embodiment, when a plurality of documents with identical images are to be created using variable print data, each identical image section is replaced with link information, and the documents are stored for security chasing. Accordingly, the size of a permanent file can be largely reduced.

Other Embodiment

Link information as explained in the above embodiments may be a two-way link instead of a one-way link. This makes it possible to improve the image search performance in chasing.

When pumping image data from a storage device 404 of each device to a storage server 105, a broken link needs to be prevented. Accordingly, at the time of the pumping processing, each device or a chasing server 109 may perform rewriting to replace old link information pointing to its storage device with new link information pointing to the storage server 105. This operation can prevent a broken link.

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code itself installed in the computer also implements the present invention. In other words, the claims of the present invention also cover a computer program for the purpose of implementing the functions of the present invention.

In this case, so long as the system or apparatus has the functions of the program, the program may be executed in any form, e.g., as object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

Further, it is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Furthermore, besides the case where the aforesaid functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2004-265927 filed on Sep. 13, 2004, the entire contents of which are hereby incorporated by reference herein.

The invention claimed is:

1. An image processing apparatus including
an acquisition unit which acquires image data;
a job executing unit which executes a job concerning an image processing of the image data acquired by the acquisition unit;
a first determination unit which determines whether related image data which matches the acquired image data is stored in a predetermined storage device;
a writing unit which (i) writes link information indicating a link to the related image data to the predetermined storage device instead of writing the acquired image data to the predetermined storage device if the related image data is stored and (ii) writes the acquired image data to the predetermined storage device if the related image data is not stored; and
a second determination unit which determines whether or not the writing unit succeeds in writing the link information or the acquired image data to the predetermined storage device,
wherein if the second determination unit determines that the writing unit does not succeed in writing the link information or the acquired image data to the predetermined storage device, the job executing unit does not execute the job concerning the image processing of the acquired image data.

2. The image processing apparatus according to claim 1, wherein said acquisition unit includes a division unit which divides image data to be processed into a plurality of areas to create a plurality of image data.

3. The image processing apparatus according to claim 1, further including a calculation unit which calculates a hash value of the image data when storing the image data in the predetermined storage device, wherein
said writing unit associates the hash value with the image data and writes the image data to the predetermined storage device, and
said first determination unit compares the hash value of the acquired image data with a hash value of image data stored in the predetermined storage device to determine whether the related image data is stored.

4. The image processing apparatus according to claim 3, further including a comparison unit which, if the hash value of the acquired image data matches the hash value of the image data stored in the predetermined storage device, compares the acquired image data with the image data stored in the predetermined storage device to determine whether the acquired image data and the stored image data match each other.

5. The image processing apparatus according to claim 4, wherein said comparison unit determines that the acquired image data and the stored image data match each other if one of a similarity value and a correlation value is greater than or equal to a predetermined value.

6. The image processing apparatus according to claim 1, wherein said acquisition unit is one of an image reading device, facsimile reception circuit, and print job reception circuit.

7. The image processing apparatus according to claim 1, wherein the predetermined storage device is shared by a plurality of image processing apparatuses over a network.

8. The image processing apparatus according to claim 1, wherein the writing unit also writes history information about a job to be executed by the job executing unit to the predetermined storage device,
the second determination unit determines whether or not the writing unit succeeds in writing the history information, and
if the second determination unit determines that the writing unit does not succeed in writing the history information, the job executing unit does not execute the job concerning the acquired image data.

9. The image processing apparatus according to claim 8, wherein the history information includes at least one of a type of job, user information inputted through a operation unit of the image processing apparatus, and text data extracted from the acquired image data by a character recognition process.

10. The image processing apparatus according to claim 1, wherein said first determination unit determines whether related image data which matches the acquired image data is stored in the predetermined storage device based on one of (i) a similarity in image layout between the acquired image data and image data stored in the predetermined storage device, (ii) a result of pattern matching between the acquired image data and image data stored in the predetermined storage device, and (iii) a number of areas in the acquired image data that match corresponding areas in image data stored in the predetermined storage device.

11. An image processing system including at least first and second image processing apparatuses,
wherein said first image processing apparatus includes
a unit which receives a search request from said second image processing apparatus,
a first determination unit which determines whether related image data which matches image data pertaining to the search request is stored in a predetermined storage device, and
a unit which transmits link information indicating a link to the related image data to said second image processing apparatus if the related image data is stored, and
said second image processing apparatus includes
a unit which acquires image data,
a job executing unit which executes a job concerning an image processing of the image data acquired by the acquisition unit,
a unit which transmits, to said first image processing apparatus, the search request to which the acquired image data pertains,
a unit which receives the link information from said first image processing apparatus as a response to the search request,
a storage unit which (i) stores the link information indicating the link to the related image data, instead of storing the acquired image data, if the link information is received and (ii) stores the acquired image data if the link information is not received, and a second determination unit which determines whether or not the storage unit succeeds in storing the link information or the acquired image data, wherein if the second determination unit determines that the storing unit does not succeed in storing the link information or the acquired image data, the job executing unit does not execute the job concerning the image processing of the acquired image data.

12. The image processing system according to claim 11, wherein said first image processing apparatus is an image transmission device including a unit which transmits image data to said second image processing apparatus.

13. The image processing system according to claim 11, wherein said first image processing apparatus is a server device which manages image data for future tracking stored in the predetermined storage device.

14. The image processing system according to claim 11, further including a transfer unit which transfers the link information and the image data stored in said storage unit to the predetermined storage device.

15. The image processing system according to claim 11, wherein said first determination unit determines whether related image data which matches the image data pertaining to the search request is stored in the predetermined storage device based on one of (i) a search based on hash value or image size, (ii) a comparison of a similarity value or correlation value to a predetermined threshold, (iii) a similarity in image layout between the image data pertaining to the search request and image data stored in the predetermined storage device, (iv) a result of pattern matching between the image data pertaining to the search request and image data stored in the predetermined storage device, and (v) a number of areas in the image data pertaining to the search request that match corresponding areas in image data stored in the predetermined storage device.

16. An image processing apparatus control method including:

a step of acquiring image data;

a job executing step of executing a job concerning an image processing of the image data acquired in the acquiring step;

a first determination step of determining whether related image data which matches the acquired image data is stored in a predetermined storage device;

a step of (i) writing link information indicating a link to the related image data to the predetermined storage device instead of writing the acquired image data to the predetermined storage device, if the related image data is stored and (ii) writing the acquired image data to the predetermined storage device if the related image data is not stored; and a second determination step of determining whether or not the writing step succeeds in writing the link information or the acquired image data to the predetermined storage device, wherein if the second determination step determines that the writing step does not succeed in writing the link information or the acquired image data to the predetermined storage device, the job executing step does not execute the job concerning the image processing of the acquired image data.

17. The image processing apparatus control method according to claim 16 wherein said first determination step determines whether related image data which matches the acquired image data is stored in the predetermined storage device based on one of (i) a search based on hash value or image size, (ii) a comparison of a similarity value or correlation value to a predetermined threshold, (iii) a similarity in image layout between the acquired image data and image data stored in the predetermined storage device, (iv) a result of pattern matching between the acquired image data and image data stored in the predetermined storage device, and (v) a number of areas in the acquired image data that match corresponding areas in image data stored in the predetermined storage device.

18. An image processing system control method performed by a system including at least first and second image processing apparatuses, said method including:

a step of, in the second image processing apparatus, acquiring image data;

a step of, in the second image processing apparatus, executing a job concerning an image processing of the image data acquired in the acquiring step;

a step of, in the second image processing apparatus, transmitting, to the first image processing apparatus, a search request pertaining to the acquired image data;

a step of, in the first image processing apparatus, receiving the search request from the second image processing apparatus;

a step of, in the first image processing apparatus, determining whether related image data which matches the image data to which the search request pertains is stored in a predetermined storage device;

a step of, in the first image processing apparatus, transmitting link information indicating a link to the related image data to the second image processing apparatus if the related image data is stored;

a step of, in the second image processing apparatus, receiving the link information from the first image processing apparatus as a response to the search request;

a step of, in the second image processing apparatus, (i) storing the link information indicating a link to the related image data, instead of storing the acquired image data, if the link information is received and (ii) storing the acquired image data if the link information is not received; and a step of, in the second image processing apparatus, determining whether or not the storing step succeeds in storing the link information or the acquired image data, wherein if it is determined that the storing step does not succeed in storing the link information or the acquired image data, the job executing step does not execute the job concerning the image processing of the acquired image data.

19. The image processing system control method according to claim 18, wherein said determining step in the first image processing apparatus determines whether related image data which matches the image data pertaining to the search request is stored in the predetermined storage device based on one of (i) a search based on hash value or image size, (ii) a comparison of a similarity value or correlation value to a predetermined threshold, (iii) a similarity in image layout between the image data pertaining to the search request and image data stored in the predetermined storage device, (iv) a result of pattern matching between the image data pertaining to the search request and image data stored in the predetermined storage device, and (v) a number of areas in the image data pertaining to the search request that match corresponding areas in image data stored in the predetermined storage device.

20. A control program, stored in a computer-readable medium, for an image processing apparatus, the control program causing the image processing apparatus to execute:
- a step of acquiring image data;
- a step of executing a job concerning an image processing of the acquired image data;
- a first determination step of determining whether related image data which matches the acquired image data is stored in a predetermined storage device;
- a step of (i) writing link information indicating a link to the related image data to the predetermined storage device, instead of writing the acquired image data to the predetermined storage device, if the related image data is stored and (ii) writing the acquired image data to the predetermined storage device if the related image data is not stored; and
- a second determination step of determining whether or not the writing step succeeds in writing the link information or the acquired image data to the predetermined storage device,
- wherein if the second determination step determines that the writing step does not succeed in writing the link information or the acquired image data to the predetermined storage device, the job executing step does not execute the job concerning the image processing of the acquired image data.

* * * * *